Figure 1:
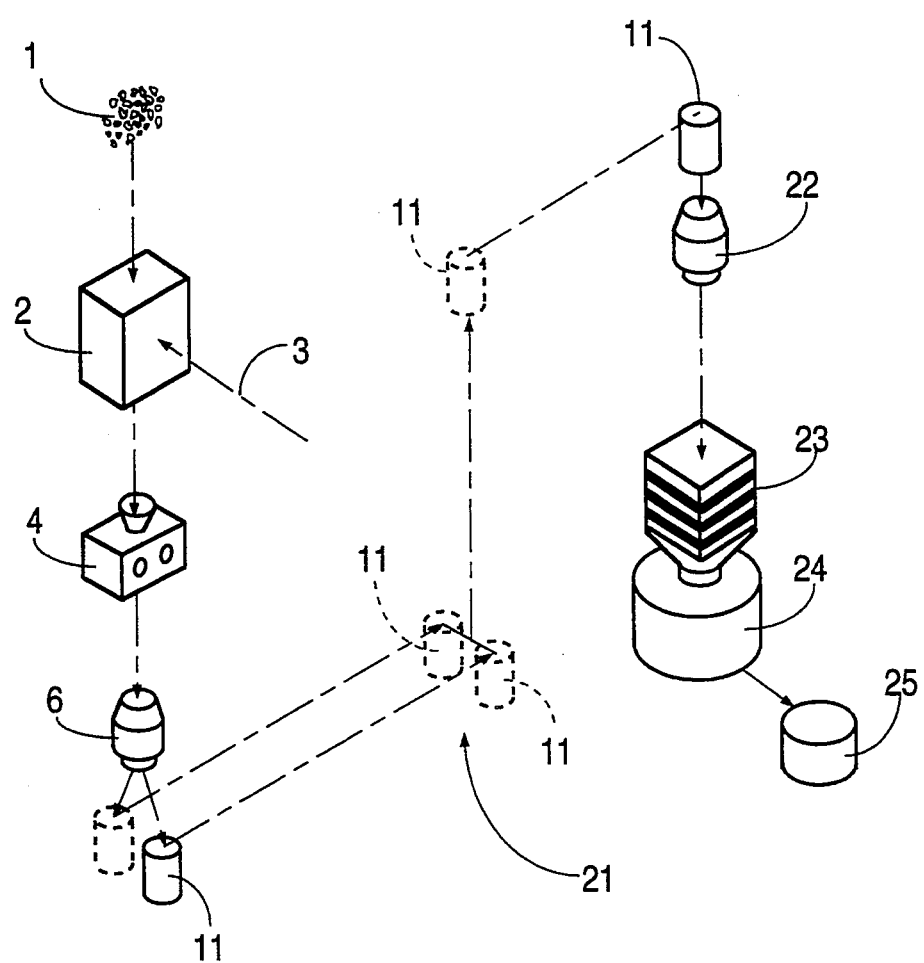

United States Patent

Bergendahl et al.

[11] Patent Number: 5,376,161
[45] Date of Patent: Dec. 27, 1994

[54] STEEL MAKING PROCESS INCLUDING TRANSPORTING SPONG IRON BRIQUETTES

[75] Inventors: Hans-Georg Bergendahl, Bochum; Friedrich-Hans Grandin, Ratingen, both of Germany

[73] Assignee: Maschinenfabrik Koppern GmbH & Co. KG, Germany

[21] Appl. No.: 95,116

[22] Filed: Jul. 20, 1993

[30] Foreign Application Priority Data

Jul. 21, 1992 [DE] Germany .................. 4224055

[51] Int. Cl.⁵ .................................. C21B 13/14
[52] U.S. Cl. ........................... 75/436; 75/316
[58] Field of Search ............................ 75/436, 316

[56] References Cited

U.S. PATENT DOCUMENTS

| | | | |
|---|---|---|---|
| 4,116,678 | 9/1978 | Lafont et al. | 75/436 |
| 4,946,498 | 8/1990 | Weber | 75/436 |

FOREIGN PATENT DOCUMENTS

| | | |
|---|---|---|
| 2935707C2 | 7/1986 | Germany . |
| 3735150A1 | 5/1989 | Germany . |
| 3806861C1 | 6/1989 | Germany . |
| 4041689A1 | 10/1991 | Germany . |

Primary Examiner—Melvyn J. Andrews
Attorney, Agent, or Firm—Skjerven, Morrill, MacPherson, Franklin & Friel

[57] ABSTRACT

Sponge iron particles obtained in a reduction unit are, subsequently, subjected to a hot-briquetting process and supplied to the refining vessel in a condition in which they are still hot from the hot-briquetting process. By means of this measure, the amount of energy consumed in the steel making process is reduced. The transport of the sponge iron briquettes from the hot-briquetting unit to the refining vessel can preferably be carried out in heat-insulated buckets. Possible heat losses which may perhaps still occur can be compensated for by a pre-heater preceding the refining vessel. For this purpose, the hot sponge iron briquettes are filled into the pre-heater, where they will then be heated by the hot waste gases originating from the refining vessel. In addition, this process offers a solution for the smooth transition from the continuous production of sponge iron briquettes to the discontinuous refining process.

13 Claims, 5 Drawing Sheets

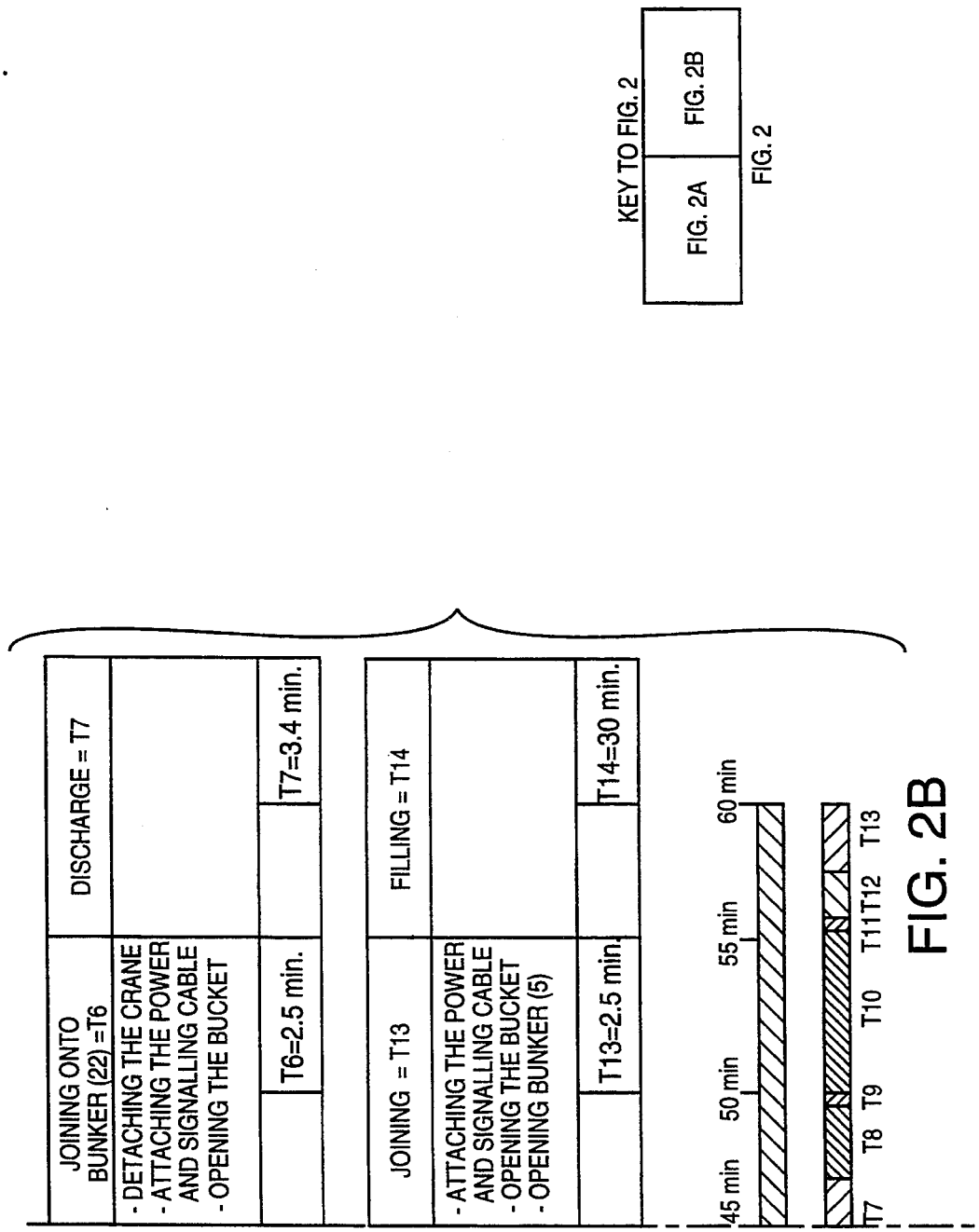

STEEL MAKING PROCESS INCLUDING TRANSPORTING SPONG IRON BRIQUETTES

The present invention relates to a steel making process comprising the steps of reducing fine ore and/or pellets and/or lump ore in a reduction unit so as to obtain sponge iron particles, hot-briquetting said sponge iron particles after discharge from said reduction unit, and supplying the sponge iron briquettes after the hot-briquetting process to a melting vessel.

Such a process is known from DE 29 35 706 C2. This publication describes a direct reduction process for reducing metal oxides so as to obtain a hot, metallized iron product in solid form. The iron product is then transferred to a melting vessel for producing steel. The plant comprises a reduction furnace at the outlet of which a hot-briquetting unit is arranged. The hot briquette product can either be discharged into a quenching tank or it can be cooled with the aid of arbitrary other means, e.g. with the aid of air cooling. This has the effect that additional amounts of energy will have to be used in the melting vessel for reheating the sponge iron briquettes to the adequate temperature.

DE 29 35 707 C2 additionally discloses an alternative which can be used instead of the hot-briquetting process and in the case of which the hot sponge iron particles are discharged from the reduction furnace directly into a receptacle. After having been filled, the receptacle is tightly closed and is then transported to an electric furnace for producing steel, said sponge iron particles being filled into said electric furnace in a hot condition.

The present invention is based on the technical problem of further developing the process of the type described above in such a way that energy will be saved.

The present invention solves this problem transporting by the sponge iron briquettes a melting vessel, which is constructed as a refining vessel, while keeping the heat losses as small as possible, supplying said sponge briquettes to the refining vessel via a preheater preceding said refining vessel in a condition in which they are still hot from the hot-briquetting process, said preheater having supplied thereto hot waste gases, which are discharged from the refining vessel, for heating said sponge iron briquettes, and refining said sponge iron briquettes in said refining vessel while adding carbon carriers and oxygen.

It is true that DE 37 35 150 A1 discloses a method of supplying thermal energy to molten metal, but, in the case of said method, metal-cased coal briquettes are filled into a charging material preheater. The charging material preheater is arranged above the melting vessel. Furthermore, the hot waste gases of the melting vessel are introduced into said charging material preheater for heating the coal briquettes and the scrap. The use of a preheater for sponge iron briquettes is not taught by said reference.

When the process according to the present invention is applied, the large amounts of energy, which are still stored in the sponge iron briquettes after hot-briquetting, are made available to the process taking place in the refining vessel. Possible losses, which may occur on the way from the hot-briquetting unit to the refining vessel, are compensated for in a most simple manner by a preheater preceding the refining vessel. In this connection, it is possible to make use of existing plant concepts. In particular, a steel making furnace has become known under the name of EOF (Energy Optimising Furnace), said furnace comprising a refining vessel and a preheater, which precedes said refining vessel and which is used for heating and charging scrap. This preheater, which is intended to be used for scrap, is now used in the process according to the present invention for heating the sponge iron briquettes in order to compensate for heat losses. Furthermore, the process according to the present invention shows the particularity that it requires also carbon carriers, in addition to oxygen, as a heat source for the refining process. The carbon is dissolved in the molten bath, and, due to the oxygen injected into the molten bath, it permits an optimum introduction of heat into the melt. The waste gases produced when the carbon is burnt are burnt in the refining vessel and introduced into the preheater for heating the sponge iron briquettes. The process according to the present invention is characterized by low production costs, since e.g. an additional input of heat by means of electric energy is not required.

In addition to the above-mentioned references, DE 38 06 861 C1 discloses a transport system for hot sponge iron. In this transport system, intermediate bunkers and heat-insulated transport receptacles are used. The transport receptacles are equipped with closure members, e.g. hinged closure means, at their upper and lower openings. The bunkers and the transport receptacles are emptied and filled in a staggered mode in such a way that a continuous supply of sponge iron to a briquetting unit can be carried out.

DE 40 41 689 A1 describes a process for producing steel from ferriferous metal oxides. This publication discloses, among other measures, the intermediate storage of hot sponge iron in a bunker.

By means of the use of heat-insulated receptacles according to claim 2, the heat losses of the sponge iron briquettes can be counteracted. Moreover, the use of heat-insulated receptacles represents an economical solution to the problem of producing steel in a more energy-efficient manner.

By means of the feature according to claim 3, charging of the refining vessel from a single heat-insulated receptacle can be carried out in a very simple manner. Delays in the refining vessel filling operation will thus be avoided. In addition, the whole content of the heat-insulated receptacle will be charged into the refining vessel, whereby hot sponge iron briquettes will not be stored longer than necessary in the heat-insulated vessel.

On the basis of the process variation according to claim 4, a loss of time, caused e.g. by additional tilting or rotating of the heat-insulated receptacle, will be avoided. The filling of the heat-insulated receptacle at the hot-briquetting unit is then carried out through the upper inlet opening, which will be closed after the filling operation. Subsequently, the heat-insulated receptacle will be transported to the refining vessel. Upon arriving at the refining vessel, the lower outlet opening will be opened and the charging process of the refining vessel begins. This mode of operation of the heat-insulated receptacle does not require any energy-consuming tilting or turning means for the respective filling operations.

By using two heat-insulated receptacles to transport the sponge iron briquettes according to claim 5, the process of hot-briquetting the sponge iron and the batchwise refining in the refining vessel can be adapted to one another. The filling of the heat-insulated receptacle and the subsequent transport to the refining vessel will then require approximately the same period of time as the refining process of a charge in the refining vessel. In the meantime, the second heat-insulated receptacle is filled with hot sponge iron briquettes. The reduction unit with subsequent hot-briquetting unit and the refining vessel can thus be utilized to the full in the best possible manner. One charge after the other can be processed in the refining vessel with minimal loss of time.

An advantageous embodiment of the process according to the present invention is the embodiment according to claim 6. Crane systems are the preferred means of transport in the metallurgical industry, and, consequently, they are comparatively economical. The fact that the heat-insulated buckets are transported in a suspended condition makes any additional transport paths, which would take up too much room, superfluous. Moreover, crane systems that may be used for bucket transport are often a constituent part of existing plants. By means of the intermediate storage in bunkers according to claim 7, delays occurring during the transport and/or process sequence can be compensated for by a purposeful arrangement of said bunkers. Hence, a smooth sequence of process steps is guaranteed for the whole process. The buffer effect of the bunkers will simplify the transition from the continuous production of sponge iron briquettes to the discontinuous batchwise refining process still further.

In accordance with claim 8, heat-insulated bunkers are preferably used. It follows that heat losses occurring during storage in the bunkers are reduced as far as possible.

Figure 2A:
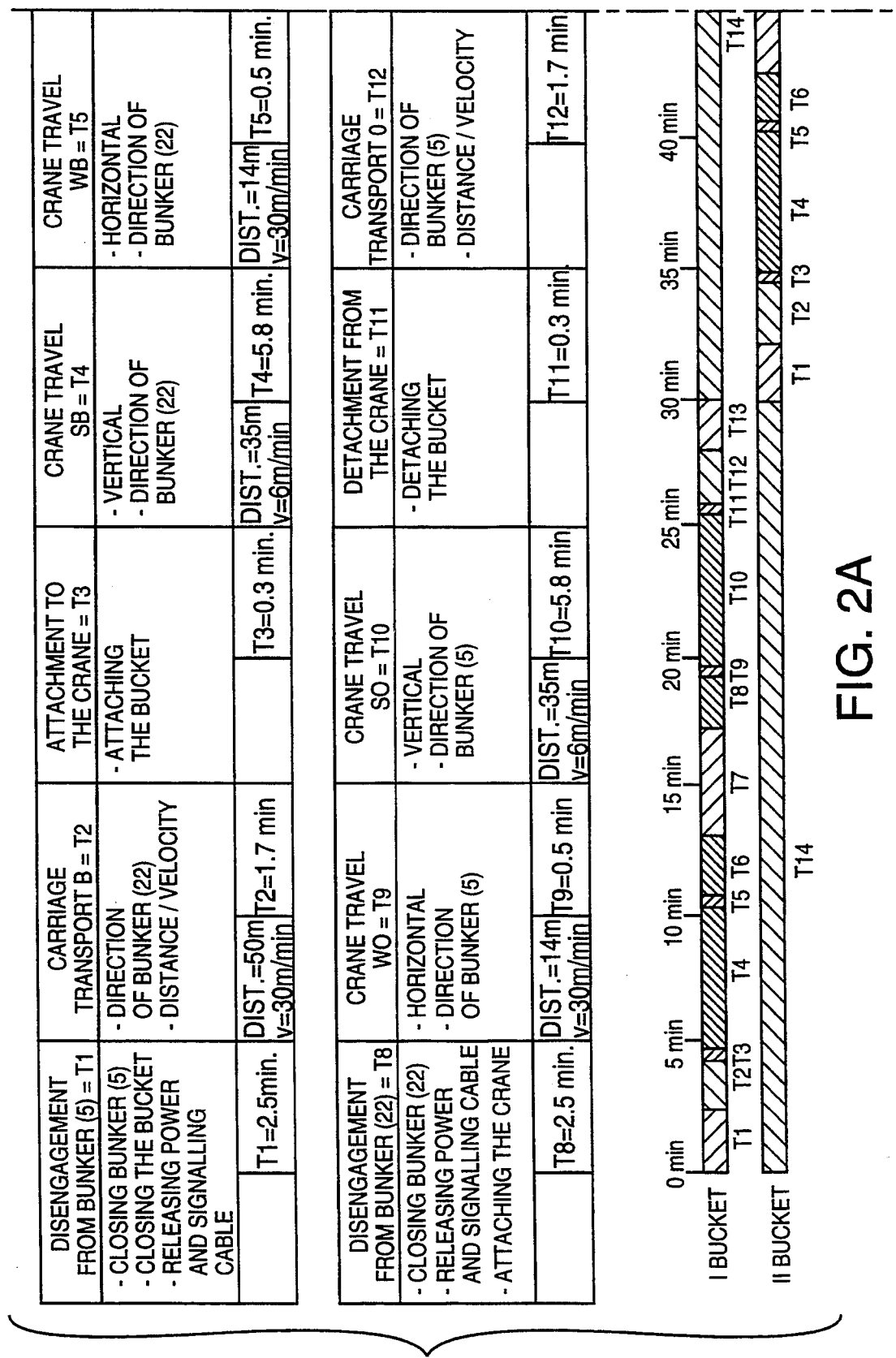
Figure 3:
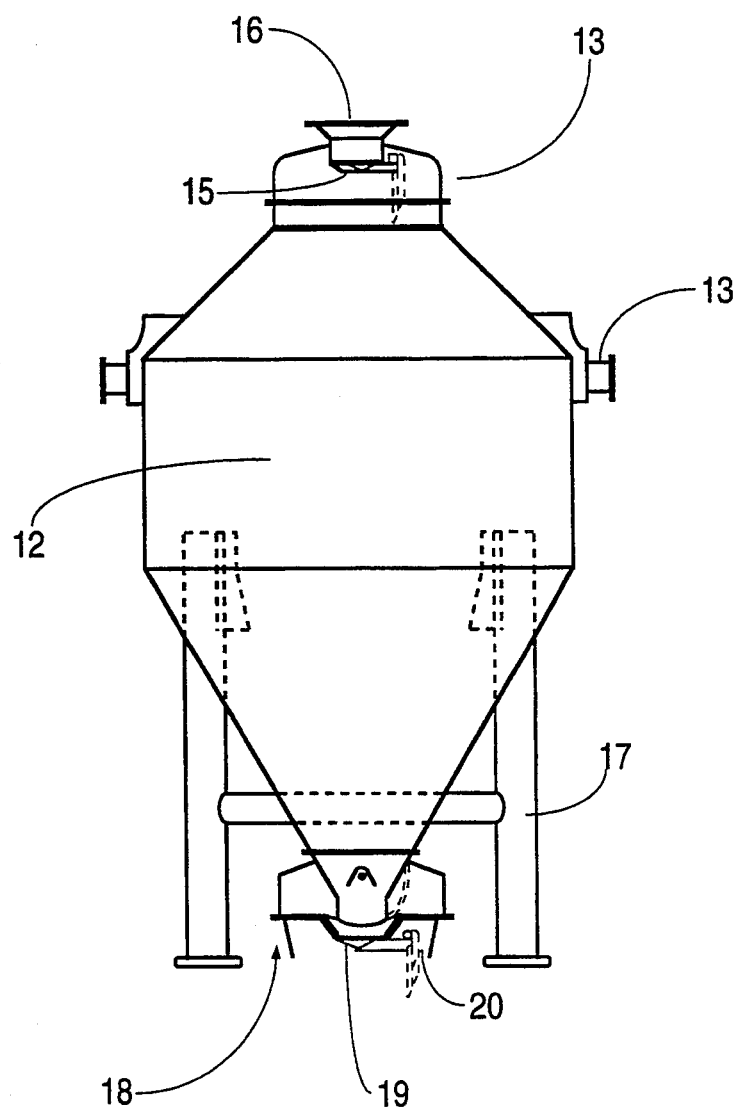
Figure 4:
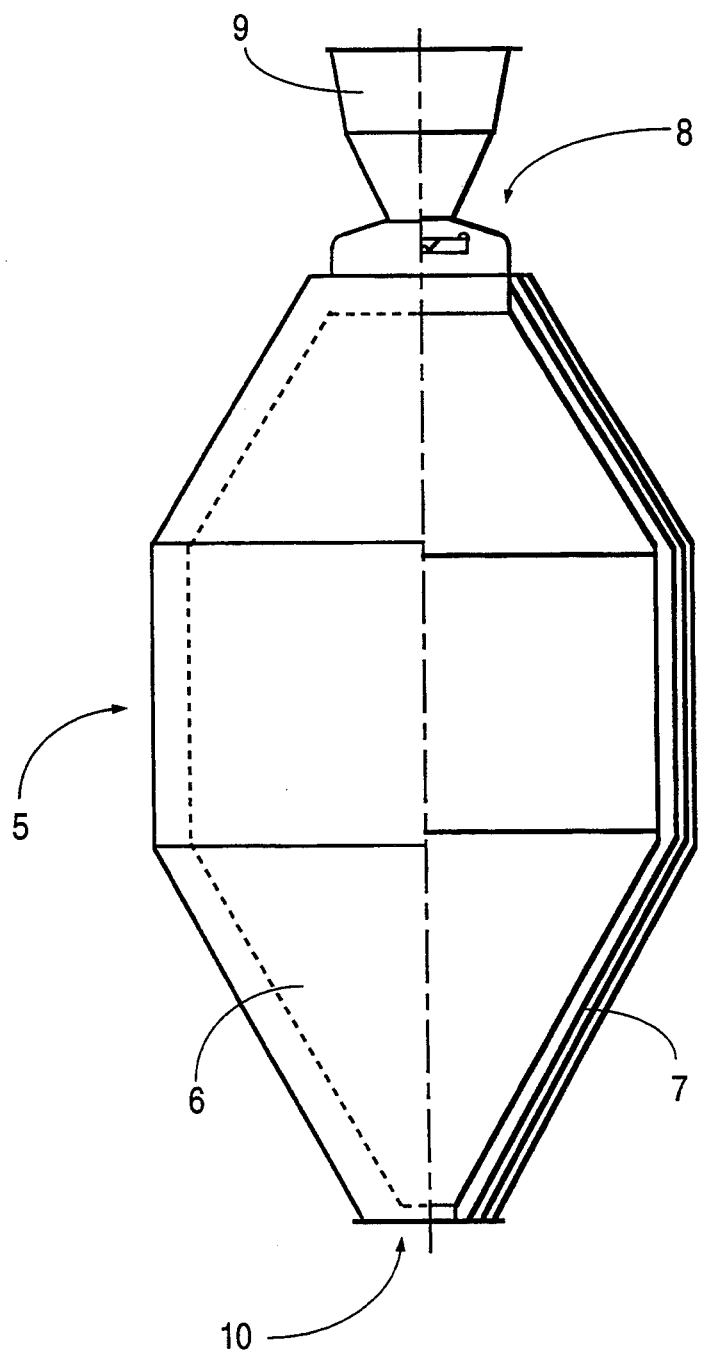

In the following, the process according to the present invention will be explained in detail on the basis of a drawing, in which:

FIG. 1 shows a schematic representation of a process sequence according to the present invention, FIG. 2 shows a preferred timing scheme for the process sequence according to the present invention as shown in FIG. 1, FIG. 3 shows a heat-insulated receptacle used for transporting sponge iron briquettes, FIG. 4 shows a view of a heat-insulated bunker used for storing sponge iron briquettes, one half of said view being a sectional view.

For the process sequence according to the present invention shown in FIG. 1, an initial product 1 is required. Fine ore and/or pellets and/or lump ore is/are available as an initial product 1 for the steel making process. The initial product 1 is supplied to a reduction unit 2 in a continuous process. In said reduction unit, the initial product 1 is converted into sponge iron particles under the influence of a reducing agent 3. The production of sponge iron in the reduction unit 2 takes place under the influence of strong heat. The sponge iron particles discharged in a hot condition from the reduction unit 2 are supplied to a hot-briquetting unit 4. The hot-briquetting unit 4 is preferably constructed as a roller press unit. After the production of the sponge iron briquettes in the hot-briquetting unit 4, said sponge iron briquettes are stored intermediately in a first bunker 5.

As can be seen in FIG. 4, the first bunker 5 is provided with a housing jacket 6 lined with a heat-insulating layer 7 on the inner side thereof. At the upper end 8 of the first bunker 5, a funnel-shaped feed hopper 9 is provided. The feed hopper 9 facilitates the introduction of the sponge iron briquettes. The sponge iron briquettes stored in said first bunker 5 are removed through the lower end 10 of said first bunker 5.

After having been stored intermediately in said first bunker 5, the sponge iron briquettes are filled into a bucket 11. In this filling position, the bucket 11 is preferably arranged on a carriage, which is not shown.

In FIG. 3, the exact structural design of the bucket 11 is shown. Said bucket 11 comprises a housing 12, which is hollow in the interior thereof and the upper section of which is provided with a hook crossbar 13 projecting at both sides for attachment to a crane system, which is not shown. The upper receptacle section 14 of said bucket 11 is provided with an inlet opening 16 adapted to be closed by means of a cover 15. The bucket 11 is equipped with a support frame 17 so that it can be placed in an upright position on a carriage, which is not shown, or deposited on a base plate. A discharge opening 20, which is adapted to be locked by a closure means 19, is arranged at a lower receptacle section 18. Just like the first bunker 5, the bucket 11 is provided on the interior wall thereof with a heat-insulating layer, which is not shown.

The bucket 11 is conveyed by means of the carriage into a pick-up position 21 (FIG. 1) for attachment to a lifting device, which is not shown. The bucket 11 is picked up by the lifting device and is advanced to a position above a second bunker 22 for discharging. The second bunker 22 has a structural design which is identical with or similar to that of the first bunker 5. After having been stored intermediately in the second bunker 22, the sponge iron briquettes are supplied to a refining vessel 24 in accordance with the batch cycle. Due to the fact that they are transported and intermediately stored in heat-insulated buckets, the hot-pressed sponge iron briquettes will hardly lose any heat on their way from the hot-briquetting unit 4 to the refining vessel 24.

A small loss of heat, which cannot be avoided, will be compensated for by a preheater 23, which precedes the refining vessel 24 and through which the briquettes pass upon travelling to the refining vessel 24. The sponge iron briquettes, which are already hot anyhow, will rapidly be heated still further by the hot waste gases of the refining vessel 24 flowing into said preheater 23.

Carbon carriers and oxygen are introduced in the refining vessel 24. When the refining process has been terminated, the steel produced is filled into a ladle 25 for further utilization.

In the following, the mode of operation of the process according to the present invention will be explained in detail on the basis of a timing chart with the aid of FIG. 2.

FIG. 2 describes the mode of operation during the transport from the first bunker 5 to the second bunker 22 with the aid of two buckets 11. In the upper section of FIG. 2, the whole process path of a bucket 11 from the first bunker 5 to the second bunker 22 and back is shown by the times T1 to T14. In order to make the timing chart more easily understandable, exemplary times, which have been determined in the course of one process sequence and which are expressed in minutes, are indicated in connection with the times T1 to T14. The time T1 comprises the following activities:

closing the first bunker 5,
closing the bucket 11,
releasing the power and signalling cable.

In the course of this process, the bucket 11 is arranged on a carriage. FIG. 2 also discloses exemplary distances and velocities for determining the individual travelling times. The time T2 indicates the length of time which the carriage needs for travelling from the first bunker 5 to the pick-up position 21. The time required for attaching the lifting device to the bucket 11 at the pick-up position 21 corresponds to the time T3. The time T4 is indicative of the vertical displacement path and the time T5 of the horizontal displacement path of the lifting device in the direction of the second bunker 22. Joining onto the second bunker 22 will require the time T6. The time T6 comprises the following activities:

detaching the lifting device, attaching the power and signalling cable, opening the bucket 11.

Subsequently, the sponge iron briquettes are discharged from the bucket 11 into the second bunker 22 during the time T7. The times T8 to T14 show, in reverse order, the return route of the bucket 11, which is now empty. The time T14 comprises the refilling of the bucket 11 with sponge iron briquettes.

In the lower part of FIG. 2, it is shown how the time-shifted transport of the sponge iron briquettes by two buckets 11 is organized. It is clearly evident that the filling time T14 of the second bucket merges smoothly with the filling time T14 of the first bucket. An almost continuous production of sponge iron briquettes is thus guaranteed. This almost uninterrupted alternation of the buckets avoids idle times which could result in unnecessary heat losses of the sponge iron briquettes. The heat-insulated buckets 11 additionally contribute to the fact that the temperature of the sponge iron briquettes can be maintained almost constant on the transport path from the first bunker 5 to the second bunker 22. The use of a preheater 23 in combination with the heat-insulated buckets 11 and bunkers 5 and 22 causes a considerable reduction of the energy consumed in the process according to the present invention.

We claim:

1. A steel making process comprising the steps of reducing fine ore and/or pellets and/or lump ore in a reduction unit (2) so as to obtain sponge iron particles, hot-briquetting the sponge iron particles after discharge from the reduction unit (2) so as to obtain sponge iron briquettes, and supplying the sponge iron briquettes to a melting vessel, wherein the improvement comprises the steps of:

transporting the sponge iron briquettes to a preheater (23) while keeping heat losses as small as possible so that the sponge iron briquettes are still hot from the hot-briquetting process;

transporting the sponge iron briquettes from the preheater to a melting vessel (24), which is constructed as a refining vessel;

refining the sponge iron briquettes in the refining vessel while adding carbon carriers and oxygen; and supplying hot waste gases that are discharged from the refining vessel to the preheater for heating the sponge iron briquettes.

2. A process according to claim 1, characterized in that, after the hot-briquetting process, the sponge iron briquettes are received by a heat-insulated receptacle, transported to the preheater, and fed into the preheater.

3. A process according to claim 2, characterized in that the capacity of the heat-insulated receptacle is essentially adapted to that of the refining vessel (24).

4. A process according to claim 2, characterized in that a heat-insulated receptacle is used, which is provided with a closable inlet opening (16) arranged at an upper receptacle section (14) and with a closable discharge opening (20) arranged at a lower receptacle section (18).

5. A process according to claim 3, characterized in that a heat-insulated receptacle is used, which is provided with a closable inlet opening (16) arranged at an upper receptacle section (14) and with a closable discharge opening (20) arranged at a lower receptacle section (18).

6. A process according to claim 5 characterized in that, after the hot-briquetting process, the sponge iron briquettes are received by one of at least two heat-insulated receptacles in turn and are transported in a time-shifted mode of transport to the refining vessel (24) in such a way that an essentially continuous filling of the heat-insulated receptacles after the hot-briquetting process is achieved.

7. A process according to claim 2, characterized in that a bucket (11), which is adapted to be picked up by a lifting device, is used as a heat-insulated receptacle.

8. A process according to claim 3, characterized in that a bucket (11), which is adapted to be picked up by a lifting device, is used as a heat-insulated receptacle.

9. A process according to claim 4, characterized in that a bucket (11), which is adapted to be picked up by a lifting device, is used as a heat-insulated receptacle.

10. A process according to claim 5, characterized in that a bucket (11), which is adapted to be picked up by a lifting device, is used as a heat-insulated receptacle.

11. A process according to claim 6, characterized in that a bucket (11), which is adapted to be picked up by a lifting device, is used as a heat-insulated receptacle.

12. A process according to claim 11, comprising the additional step of intermediately storing the sponge iron briquettes in a hot condition in at least one bunker (5 and 22, respectively).

13. A process according to claim 12, characterized in that the bunker is heat-insulated (5 and 22, respectively).

* * * * *